United States Patent [19]

Kuboniwa et al.

[11] Patent Number: 4,689,520

[45] Date of Patent: Aug. 25, 1987

[54] COLOR CATHODE RAY TUBE HAVING AN IMPROVED COLOR PHOSPHOR SCREEN

[75] Inventors: Shigeo Kuboniwa; Hideki Okada; Michio Tamura, all of Shinagawa, Japan

[73] Assignee: Sony Corporation, Tokyo, Japan

[21] Appl. No.: 755,331

[22] PCT Filed: Oct. 25, 1984

[86] PCT No.: PCT/JP84/00506

§ 371 Date: Jun. 28, 1985

§ 102(e) Date: Jun. 28, 1985

[87] PCT Pub. No.: WO85/01952

PCT Pub. Date: May 9, 1985

[30] Foreign Application Priority Data

Oct. 31, 1983 [JP] Japan ................................ 58-203958

[51] Int. Cl.$^4$ ............................................. H01J 29/20
[52] U.S. Cl. ............................... 313/468; 252/301.6 S
[58] Field of Search ............... 313/467, 468, 487, 473; 252/301.6 R, 301.6 S

[56] References Cited

U.S. PATENT DOCUMENTS

| | | | |
|---|---|---|---|
| 3,742,291 | 6/1973 | Yamada | 313/468 X |
| 4,151,442 | 4/1979 | Koga et al. | 313/467 |
| 4,424,467 | 1/1984 | Masuda et al. | 313/467 |

Primary Examiner—Palmer C. DeMeo
Assistant Examiner—K. Wieder
Attorney, Agent, or Firm—Hill, Van Santen, Steadman & Simpson

[57] ABSTRACT

According to the present invention, there is provided a color cathode ray tube of multi-purpose use in which as a red phosphor of a color phosphor screen, (ZnCd)S : Ag or (ZnCd)S : Cu phosphor of short decay time is added to rare earth phosphor to have an adding amount of 5 to 30 weight % relative to the total amount of red phosphor so that with respect to the red light emission, the high visibility brightness similar to that of the ordinary color television picture tube can be obtained. Also, since the brightness is lowered rapidly in the early stage of the light emission, the address detection can be carried out positively by, for example, a light pen pick-up.

6 Claims, No Drawings

COLOR CATHODE RAY TUBE HAVING AN IMPROVED COLOR PHOSPHOR SCREEN

DESCRIPTION

TECHNICAL FIELD

The present invention relates to a color cathode ray tube and particularly to a color cathode ray tube which can be used as an ordinary color television picture tube and also a color display apparatus of light pen pick-up system for a terminal display apparatus.

BACKGROUND ART

In a so-called character display apparatus for displaying very small patterns such as character, symbol, figure and so on in a terminal display apparatus, in order to obtain a reproduced picture of high definition, the interlaced scanning system of 2 field and 1 frame type is not adopted but such a scanning system is employed in which the respective scanning lines are sequentially scanned because the positional displacement between the adjacent scanning lines of each field must be avoided.

Recently, in accordance with the introduction of home computers, a single cathode ray tube for multipurpose use has been developed which can be used as an ordinary color television picture tube suitable for a terminal display apparatus and which can be changed from the ordinary television picture receiving mode to the non-interlaced scanning mode with the frequency of 60 Hz.

In such color cathode ray tube of multi-purpose use, particularly when it is used as the terminal display apparatus for carrying out the address detection by a light pen pick-up, since it is necessary to detect the moment an electron beam passes the phosphor screen by this light pen pick-up, so long as a certain output level can be obtained, the phosphor is required to have a relatively short decay time so as to increase the pick-up accuracy.

However, in the color phosphor screen of the color cathode ray tube used as the ordinary color television picture tube, the decay time of the green and blue phosphors is around several tens microseconds. So, the address of such color phosphors can be detected by light pen pick-up system. Whereas, rare earth phosphors generally used as red phosphors, for example, $Y_2O_2S$:Eu or $Y_2O_3$:Eu or $YVO_4$:Eu have a relatively long decay time as long as 1 milli second (decay time is the time until the brightness of phosphor decreases to 1/10 the brightness of the initial light emission). Thus such red phosphor will interfere with the address detection.

As described above, the present invention is to provide a color cathode ray tube of multi-purpose use which can be used as the terminal display apparatus of, for example, light pen pick-up system and in which the address detection can be carried out positively.

In other words, the present invention is to provide a color cathode ray tube which can positively carry out the address detection by the light pen pick-up system without substantially changing chromaticity and brightness of the red phosphor and without interfering with the use of it as the ordinary color television receiver.

DISCLOSURE OF INVENTION

According to the present invention, similarly to the ordinary color cathode ray tube, a phosphor screen thereof is formed by repeatedly and sequentially coating red, green and blue phosphors to have a predetermined pattern, for example, stripe-shape or do-shape in a predetermined order. Particularly in the present invention, (ZnCd)S:Ag or (ZnCd)S:Cu phosphor is mixed to the usual rare earth phosphor, for example, $Y_2O_2S$:Eu, $Y_2O_3$:Eu and $YVO_4$:Eu with the mixing ratio of 5 to 30 weight % relative to the total amount of red phosphor and then the color phosphor screen is formed by using such red phosphor.

BEST MODE FOR CARRYING OUT THE INVENTION

As earlier noted, in the color cathode ray tube of the present invention, the color phosphor screen thereof is formed by respectively coating red, green and blue phosphors with predetermined order and alignment. In this case, the blue phosphor is made of, for example, ZnS:Ag and the green phosphor is made of, for example, ZnS:CuAl. The red phosphor is made by mixing red phosphor, (ZnCd)S:Ag (ZnS:CdS=2:8) to the prior art rare earth phosphor $Y_2O_2S$:Eu with the mixing ratio of 5 to 30 weight % relative to the total amount of red phosphor.

The respective characteristics of these blue, green and red phosphors are shown on the table 1 for comparison.

TABLE

| | Phosphors | energy efficiency | lumen efficiency | decay time |
|---|---|---|---|---|
| blue | ZnS:Ag | 20 to 25% | ~12% | 20 to 30 $\mu$sec |
| green | ZnS:CuAl | ~25% | ~100% | 50 $\mu$sec |
| red | $Y_2O_2S$:Eu | 10 to 13% | ~25% | 1 m sec |
| | (ZnCd)S:Ag | 17% | 13.6% | 50 $\mu$sec |

As will be clear from Table 1, since (ZnCd)S:Ag added to the red phosphor presents high energy efficiency as compared with rare earth red phosphor, $Y_2O_2S$:Eu, the light emission from the short persistence (ZnCd)S:Ag makes an important contribution to the address detection by the light pen pick-up. Whereas, with respect to the rare earth phosphor $Y_2O_2S$:Eu having a relatively long decay time, since its lumen efficiency is high, the red light emission from this rare earth phosphor makes an important contribution to the naked eyes. As described above, since (ZnCd)S:Ag is high in energy efficiency, the energy necessary for the address detection can be obtained by adding this phosphor to the rare earth red phosphor with a relatively small adding amount, for example, 30 weight %. Accordingly, although the lowering of the brightness to the naked eyes caused by the added phosphor can be suppressed to about 86% of the brightness presented when a single substance of rare earth red phosphor is used. Thus the practical problem can be avoided. In an environmental pollution standpoint, if the phosphor, (ZnCd)S:Ag added to the red phosphor is replaced by the (ZnCd)S:Cu phosphor (Zn:Cd=6:4), the similar effects can be achieved. In this case, the amount of Cd used can be reduced by half as compared with the case of using (ZnCd)S:Ag.

The reason why the adding amount of (ZnCd)S:Ag or (ZnCd)S:Cu phosphor as the additive to the rare earth red phosphor is selected in a range from 5 to 30 weight % is as follows. If the adding amount exceeds 30 weight %. the visibility brightness is lowered to less than 85% and there is caused a practical problem. If, on the other hand, the adding amount is less than 5 weight %, the effect as the detecting light for the light pen pick-up becomes insufficient.

As the light pen pick-up used for the color cathode ray tube according to this invention, there is used a pick-up which can provide a detecting sensitivity of about the same degree for the respective red, green and blue lights.

As described above, although the color cathode ray tube of the present invention uses as the red phosphor of the color phosphor screen the rear earth phosphor having high visibility brightness, i.e., high lumen efficiency, owing to the addition of (ZnCd)S:Ag or (ZnCd)S:Cu phosphor having light emission of short decay time and a high energy efficiency, the address detection can be carried out positively by the light pen pick-up. That is, according to the arrangement of the present invention, by the addition of the phosphor having short decay time, the red light emission characteristic becomes such one that its brightness is rapidly lowered in the early stage since the light emission begins. Accordingly, if the detection level by the light pen pick-up is selected properly, the light emission of long decay time can be prevented from being detected and so, the address detection can be carried out positively.

As set forth above, according to this invention, although the rare earth phosphor which is cheap and has a relatively long decay time is used as its red phosphor similarly to the color phosphor screen of the ordinary color television picture tube, (ZnCd)S:Ag or (ZnCd)S:Cu phosphor of short decay time and high energy effect is mixed into the red phosphor of the phosphor screen of the display apparatus for the light pen pick-up system so that the address detection can be carried out positively and with high sensitivity. Thus the color cathode ray tube of the present invention is suitable for a color cathode ray tube of multi-purpose use.

We claim:

1. A color cathode ray tube having a phosphor screen including blue, green and red phosphors, said red phosphor being a mixture of a phosphor selected from the group consisting of (ZnCd)S:Ag and (ZnCd)S:Cu with a rare earth phosphor.

2. A color cathode ray tube according to claim 1 wherein said rare earth phosphor is $Y_2O_2S:Eu$.

3. A color cathode ray tube according to claim 1 wherein said selected phosphor constitutes from 5 to 30% by weight of said red phosphor.

4. A color cathode ray tube having a regular pattern of blue, green and red phosphors therein, said blue phosphor being ZnS:Ag, said green phosphor being ZnS:CuAl; and said red phosphor being a mixture of a phosphor selected from the group consisting of (ZnCd)S:Ag and (ZnCd)S:Cu with a rare earth phosphor.

5. A color cathode ray tube according to claim 4 wherein said rare earth phosphor is $Y_2O_2S:Eu$.

6. A color cathode ray tube according to claim 4 wherein said selected phosphor consitutes from 5 to 30% by weight of said red phosphor.

* * * * *